United States Patent Office 3,470,607
Patented Oct. 7, 1969

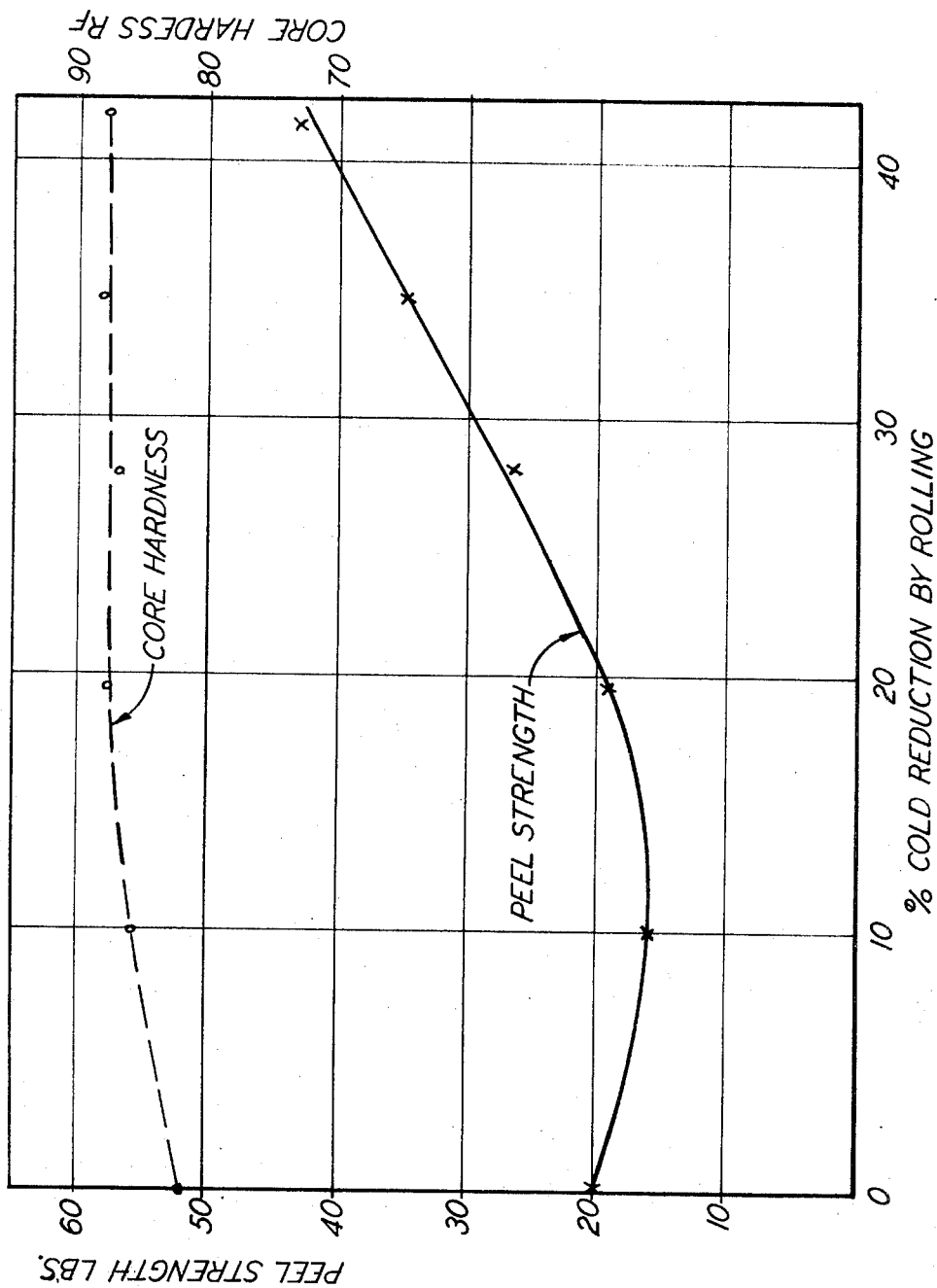

3,470,607
PROCESS FOR OBTAINING COMPOSITE ARTICLE
William M. Rader, Woodbridge, and Alan J. Goldman and Joseph Winter, New Haven, Conn., assignors to Olin Mathieson Chemical Corporation
Filed May 11, 1966, Ser. No. 549,319
Int. Cl. B21b 3/00; B23k 21/00
U.S. Cl. 29—470.1                10 Claims

ABSTRACT OF THE DISCLOSURE

A process for obtaining composite metal articles characterized by rolling together the core and cladding by cold rolling to form a green bond and cold rolling the resultant poorly bonded composite at least 5% in excess of that required to achieve maximum hardness of the core.

---

The present invention relates to a process for producing composite metal articles. More particularly, the present invention resides in a new and improved process for producing composite metal articles having a core of copper, iron, aluminum or base alloys of these metals.

Composite articles having a dissimilar core and cladding are highly desirable commercially due to the fact that the beneficial characteristics of the core and cladding materials may be obtained in one composite article. In a single alloy frequently many properties cannot be greatly modified by allowing or thermal treatments, for example, such properties as modulus of elasticity, color, density, and strength, in combination with high thermal or electrical conductivity. However, by forming composites apparent properties of the cladding can be generated while retaining the bulk properties of the core material. In this manner one can often obtain greatly modified and highly desirable properties over the single alloy.

For example, copper has the advantage of high conductivity and cold formability. By forming copper composites one can retain these desirable properties while generating properties of the cladding, such as wear resistance, color, oxidation or tarnish resistance and fine finishing, i.e., surface quality.

Various uses to which composite articles may be put are as follows: copper composites may be used for high conductivity, high strength springs; highly efficient electrical contactors; hardware involving extensive cold forming, etc.; and aluminum and iron composites may be used for heat exchangers, electrical hardware, builders hardware, utensils, automotive components, shipping containers, ornamental purposes, etc.

However, the preparation of composite articles presents numerous practical problems. It has been difficult to produce a satisfactory composite article due to the natural tendency of the cladding material to form a layer of brittle, intermetallic or non-metallic compounds at the core-clad interface. This layer may form at moderate temperatures or at elevated temperatures. The brittle layer of compounds which so forms may shatter readily on flexing of the composite material, thus clearly limiting the utility of the composite, especially in deep drawn and formed products.

The commercial engineering materials iron, copper and aluminum present further problems in the formation of composites due to the tendency to oxidize at the moderate or elevated temperatures necessary for bonding by hot rolling. This oxidation can produce an interference oxide layer which inhibits bonding. Some copper oxides of these materials are particularly difficult as they form a strongly adherent, plastic layer which extends with the substance, thus greatly interfering with bonding.

The tendency to form this peculiar oxide is particularly prevalent in copper and has necessitated special and expensive treatment conditions in order to form copper composites. Likewise iron has presented perculiar problems.

In addition, both iron and copper will produce a flaky, non-adherent oxide at elevated temperatures. This oxide is non-extensible and will, therefore, be retained at the interface thereby inhibiting bonding where present.

One method of forming composites in order to overcome these difficulties is to form a partial bond by cold rolling followed by subsequent diffusion anneals. This is an expensive process and the diffusion anneals may tend to degrade the properties of the composite.

Other art methods are quite expensive and require special atmosphere conditions at the interface or elimination of any atmosphere by welding the cladding to the core at the periphery prior to rolling, or the use of costly explosive processes.

Accordingly, it is a principal object of the present invention to provide a convenient and expeditious process whereby composite articles are obtained.

It is a further object of the present invention to provide a process as aforesaid whereby the resultant composite articles are characterized by having high bond strengths, excellent physical properties and suitable for a wide variety of uses.

It is a further object of the present invention to provide a process as aforesaid which overcomes the numerous limitations and disadvantages attendant upon the formation of conventional composite articles.

Still further objects and advantages of the present invention will appear from the ensuing discussion.

In accordance with the present invention it has now been found that the foregoing objects and advantages may be readily obtained. The process of the present invention readily overcomes the disadvantages of the art and achieves a simple and convenient process for obtaining a highly useful composite article clad on either one side or both sides and having a dissimilar core and cladding. Preferably the core is copper, iron, aluminum or base alloys of these materials. The process of the present invention comprises: (A) providing said core in plate form in a thickness less than ½-inch; (B) providing said cladding in plate form in a thickness less than ¼-inch; (C) rolling together said core and cladding to form a green bond; and (D) cold rolling the resultant poorly bonded composite at least 5% in excess of that required to achieve maximum hardness of the core. In the case of composites with a copper core, the green bond is formed with a rolling reduction of from 60 to 78%, with the subsequent cold rolling reduction being at least an additional 18% to give a total reduction of at least 75%. In the case of iron core composites the green bond is formed with a rolling reduction of from 40 to 65%, with the subsequent cold rolling reduction requiring at least an additional 10% to give a total reduction of at least 60%. In aluminum core composites, the initial reduction is 40 to 65%, with the subsequent cold rolling reduction being at least an additional 10% to give a total reduction of at least 55%. The higher the first step reduction, the lower the required second step reduction, although increase in the second step reduction continues to give a bond strength improvement, with the mill equipment being a limiting feature.

In accordance with the present invention, the poorly bonded composite is cold rolled at least 5% in excess of that required to achieve maximum hardness of the core. In general, copper has a minimum full hardness on the Rockwell Scale $R_F$ 85–95. Therefore, a total reduction of 75% in accordance with the process of the present invention yields full hardness. It should be noted that straight cold reduction of 75% may not necessarily yield full hardness. In general, iron has a minimum full hardness on the Rockwell Scale of $R_B$ 90–95. Since iron is considerably harder than either copper or aluminum, a different Rockwell Scale must be used. The minimum full hardness of aluminum on the Rockwell Scale is $R_F$ 65 to 75. Naturally, all of the above hardness values are minimum values based on commercially pure alloys. Alloyed materials will generally have higher minimum hardness values in the full hard condition.

In accordance with the present invention it has been found that the foregoing process surprisingly results in a well bonded composite while overcoming the disadvantages attendant upon the formation of conventional composites.

It is a particular advantage of the foregoing process that it is not necessary to impart any heat treatment step whatever in order to improve the bond or in order to attain the bond. This is obviously a significant commercial advantage. In addition, the foregoing process is quite simple and readily amenable to commercial operations. It is noted that in acordance with the foregoing process it is only necessary in the initial rolling step to form a green bond or a poorly bonded composite.

A surprising feature of the present invention is the fact that the resultant poorly bonded composite is surprisingly changed to a well bonded composite in accordance with a critical cold rolling step. One would normally anticipate that the bond would be caused to degrade by cold working due to the differential work hardening capacity of the components of the composite, i.e., the components of the composite would normally be expected to cold work differently thus expecting a bond degradation. In fact, it will be noted from the examples which form a part of the present specification that in the cold working process the bond initially degrades, for example, with copper core composites below 18% cold work, bond degradation occurs. However, the bond improves quite rapidly and, in fact, surprisingly so, above 18% cold reduction.

An additional highly advantageous feature of the present invention is that the process of the present invention does not require subsequent heat treating steps or annealing steps in order to obtain a good bond. This results in an oxide free surface avoiding the necessity of a cleaning step in order to remove the oxide. If heat treating or annealing steps are required, it is necessary to remove the resultant oxide formation. The composite of the present invention comes off the reduction steps at a relatively low temperature without the formation of difficultly removable oxides. Still further the provision of diffusion anneals in accordance with many art processes tends to degrade various properties of the composite, a disadvantageous feature not present in accordance with the process of the present invention.

Another advantage of the present invention is that the process of the present invention does not require the attainment of a critical temperature during either rolling operation. Also, the present process does not require a structural transformation in either component.

An additional advantage of the instant process is that the resultant composite is a hard material, ideally suited for blanking operations.

In accordance with the present invention to copper base alloys which may be employed as core materials are any alloys containing a major proportion of copper. Typical alloys which may be employed include but are not limited to the following: high purity copper, tough pitch copper, OFHC (oxygen free high conductivity) and conventional brasses and bronzes. Typical alloying substituents include but are not limited to the following: aluminum, iron, silicon, lead, phosphorus, silver, gold palladium, platinum, tin, nickel, zirconium and zinc.

The aluminum base alloys which may be used as core materials are any alloys containing a major proportion of aluminum. Typical alloys which may be employed include but are not limited to the following: high purity aluminum, aluminum alloys 1100, 6061, 3003, 3004, etc. Typical alloying substituents include but are not limited to the following: magnesium, tin, copper, manganese, silicon, iron, chromium, zinc and so forth.

The iron base alloys which may be used as core materials are any alloys containing a major proportion of iron. Typical alloys which may be employed include but are not limited to the following: high purity iron, alloys of the iron-carbon family, iron-chromium family, iron-manganese family, iron-nickel family, iron-nickel-chromium family, etc. Typical alloying substituents include but are not limited to the following: carbon, aluminum, titanium, silicon, lead, phosphorus, sulfur, chromium, zirconium and zinc.

The preferred core materials are copper base alloys.

The core material should be provided in plate form having a thickness less than ½-inch, i.e., the core material may be provided in strip, sheet or the like form.

It is preferred, but required, in accordance with the present invention to mechanically roughen the bonding surfaces of both the core and the cladding materials in order to assure good surface contact at the bite of the rolls. For example, the surfaces may be wire brushed or abraded, etc.

The cladding material may, in general, be any metal dissimilar to the core. For example, if the core is a copper base alloy, the cladding may be any of the foregoing copper base alloys, providing that the cladding material is dissimilar to the core material. By dissimilar alloy or dissimilar metal, the present invention contemplates, inter alia, both an alloy havng different alloying ingredients than the core or the same alloy as the core with different physical characteristics, e.g., grain size.

For example, any lead, tin, nickel, copper, zinc, iron, silver or aluminum alloy may preferably be employed as the cladding material. High purity tin, copper, lead, nickel, zinc, iron, silver or aluminum or base alloys of these materials may be readily employed.

Typical alloying substituents which may be employed include, but are not limited to, the following: with lead one may alloy tin, arsenic and cadmium; with tin one may alloy arsenic, cadmium, copper, lead and antimony; with nickel one may alloy chromium, iron, copper, titanium, aluminum, vanadium, tungsten, and cobalt; with zinc one may alloy copper, iron, aluminum and magnesium; with iron one may alloy carbon, nickel, chromium and manganese; with silver one may alloy copper and nickel; with aluminum one may alloy magnesium, copper, zinc, manganese, silicon, iron and chromium.

The cladding material should be in plate form less than ¼-inch in thickness, i.e., the cladding and the core material should be in wrought form, for example, coils of strip, sheet, etc. Therefore, the resultant composite has a thicknes less than 0.250 inch where the copper is clad on two sides and less than 0.188 inch where it is clad on one side. The lowest gage materials, both core and cladding, which can be conveniently worked with, is on the order of 0.001 inch.

The starting materials, both core and cladding, can be in any temper or condition, hard or soft. Surface oxides are generally no handicap to the process of the present invention.

It is highly desirable to remove dirt or adhering lubricant from the surface of the metal prior to the process of the present invention in order to assure good contact between the core and the cladding materials. Any conventional cleaning processes may be readily employed, for example, the core and cladding materials may be passed through a soap or a detergent solution in accordance with conventional procedures. Examples of such cleaning procedures include the use of commercial alkaline cleaners and solvent cleaners, such as carbon tetrachloride and trichloroethylene.

In the preferred embodiment for the formation of the green bond, upon entering the rolls, an angle is provided between the core and cladding in excess of 5° in order to insure that the core and cladding will not come together earlier than in the bite of the rolls. This is not essential, however. Generally, the included angle between the core and cladding is between 5 and 22°.

In accordance with the preferred embodiment of the present invention for the formation of the green bond, the cladding metal contacts the roll prior to contacting the core. This is true whether the core is to be clad on one side or both sides.

In accordance with the present invention the formation of the initial green bond may be achieved by any pressure reduction step. By the term "green bond" it is meant the conventional use of the term to define a poorly bonded composite. In general, one may delineate a green bond as one where the peeling force necessary to separate the components is less than 40 pounds for a ¾-inch-wide strip.

It is essential in accordance with the present invention to form the green bond by a pressure reduction step. One preferred method for forming the green bond with, for example, copper core composites, is to roll together the components with a total composite reduction of from 60 to 78% without attaining recrystallization of the copper core by insuring an unheated copper core having less than 3% cold work. That is the total reduction on the composite will be from 60 to 78% with the copper core after bonding beinug unrecrystallized and thus having a resultant $R_F$ hardness greater than 80. This is insured by utilizing a core in the unheated condition having less than 3% residual cold work. In accordance with the foregoing process the resultant bond is a green bond requiring a peeling force of less than 40 pounds for a ¾-inch-wide strip to separate the components.

In the formation of the green bond, the components should be rolled together preferably in one pass at a rolling speed in excess of 20 feet per minute.

It is an advantage of the process of the present invention that the formation of a green bond requires relatively low mill energies.

After the formation of the green bond, a cold rolling step is performed in order to provide the well bonded composite of the present invention. The composite should be cold rolled at least 5% in excess of that required to give maximum hardness. For example, in copper core composites, the cold reduction should be at least 18% with the total reduction of the composite being at least 75%. For example, where the green bond is achieved with a copper core composite utilizing a reduction of 65% to form the green bond, at least 50% cold reduction is required to form the well bonded composite. Where 78% reduction is utilized to form the green bond in the case of a copper core composite, an additional cold reduction of at least 18% is required.

The present invention will be more readily understandable from a consideration of the following illustrative examples.

EXAMPLE I

In the following example the core was clad on both sides, the core material was an electrolytic, commercial purity copper alloy containing 99.9% copper in strip form having a gage of 0.160" and the cladding material was a copper base alloy containing about 75% copper and and 25% nickel at a gage of 0.045". All of the processing of these materials was conducted in air.

Both the core and the claddings were in the fully annealed condition.

Both the core and claddings were cleaned in an alkaline detergent solution, rinsed with warm water, dried with warm dry air and the surfaces of the core and claddings abraded with a rotating wire brush.

The core and claddings were then rolled together at room temperature (approximately 78° F.) with no prior heating to either the core or claddings. The speed of the rolls was 40–150 feet per minute using a continuous, variable speed rolling mill. The materials were rolled in one pass at a reduction of 70%. The included angle between claddings was 12° with the core bisecting this. The core and claddings came together for the first time in the bite of the rolls, with the claddings contacting the rolls prior to contacting the core.

After this single pass a green bonded composite was achieved whose bond strength equaled about 20 pounds peel strength for a ¾-inch-wide strip. The peel strength is a measure of the strength of the bond and is determined on a ¾-inch-wide specimen wherein the cladding is directly peeled from the core. The peel strength is a measure of the force necessary to pull the composite apart. The higher the peel strength the better the bond.

The core was unrecrystallized and had an $R_F$ hardness of 82.

EXAMPLE II

In this example the poorly bonded composite obtained in accordance with Example I was cold rolled directly with no preliminary pretreatment of any kind.

The results were as follows:

(1) Up to 10% reduction, the bond strength steadily decreased from about 20 to 16 pounds peel strength.

(2) Above 10% reduction, the bond strength steadily increased.

(3) At about 20% reduction, the bond strength exceeded the green strength of 20 pounds peel strength.

(4) At about 40% reduction, the bond strength reached 40 pounds peel strength and continued to increase with increasing cold reduction.

These results are shown graphically in the drawing which forms a part of the present specification. In the drawing, peel strength and core hardness are plotted versus rolling reduction.

In general, in the foregoing example, the maximum core hardness was achieved somewhat after the minima in the peel strength versus reduction curve which was at about 10–15% cold reduction. The hardness of the core at 40% cold reduction is essentially the same as at 15% cold reduction.

EXAMPLE III

In the following example, a green bonded composite was prepared in a manner after Example I with the exception that the core material was a commeicial grade iron alloy containing about 0.10% carbon in strip form having a gage of 0.080" and the cladding material was a copper base alloy containing about 90.0% copper, balance zinc at a gage of 0.010".

The core and the claddings were cleaned and rolled as in Example I, with the one pass reduction being 60% and the included angle between the core and claddings being 12°, with the core and claddings coming together for the first time in the bite of the rolls and with the claddings contacting the rolls prior to contacting the core.

After the single pass a green bonded composite was achieved whose bond strength was 15 pounds peel strength for a ¾-inch-wide strip. The core had an $R_B$ hardness of 89.

EXAMPLE IV

The poorly bonded composite from Example III was cold rolled directly with no preliminary pretreatment of any kind. The results were as follows:

(1) At 10% reduction, the bond strength increased to about 19 pounds peel strength and the hardness of the core increased to about $R_B$ 91.

(2) At 25% reduction, the peel strength increased to about 48 pounds.

(3) Additional cold reduction continued to increase the peel strength while the hardness of the core remained essentially the same as that observed at 10% cold reduction.

EXAMPLE V

A composite was obtained in a manner after Example I with the exception that the core material was aluminum alloy 7075 and the cladding material was 70–30 brass.

The core was a strip having a gage of 0.125" and the cladding had a gage of 0.015".

The core and claddings were cleaned and rolled as in Example I with the exception that the included angle between claddings was 20° with the core bisecting this.

After a single pass of 50% reduction a green bonded composite was achieved whose bond strength was 15 pounds peel strength for a ¾-inch-wide strip.

The core had an $R_F$ hardness of 63.

EXAMPLE VI

The material from Example V was cold rolled directly with no preliminary pretreatment of any kind. The results were as follows:

(1) At 15% reduction, the bond strength increased to about 25 pounds peel strength and the hardness of the core increased to about 68.

(2) At 25% reduction, the peel strength increased to about 45 pounds peel strength.

(3) Additional cold reduction continued to increase the peel strength while the hardness of the core remained essentially the same as that observed at 15% cold reduction.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for obtaining a composite article having a metal core selected from the group consisting of aluminum, copper, iron and base alloys thereof, clad with a dissimilar metal which comprises:

(A) providing said core in plate form in a thickness less than ½ inch;

(B) providing said cladding in plate form in a thickness less than ¼ inch;

(C) rolling together said core and cladding by cold rolling to form a green bond;

(D) cold rolling the resultant poorly bonded composite at least a 5% reduction in thickness in excess of that required to achieve substantial leveling off of the core hardness at its maximum with additional reduction, thereby forming an integrated composite article.

2. A process according to claim 1 wherein said core and cladding come together for the first time in the bite of the rolls, said cladding contacting the roll prior to contacting the core, with the included angle between core and cladding upon entering the rolls being in excess of 5°.

3. A process according to claim 1 wherein said rolling speed in step C is in excess of 20 feet per minute.

4. A process according to claim 1 wherein said core is a copper base alloy, with the reduction in step C being from 60 to 78%, the cold reduction in step D being at least an additional 18% to give a total reduction of at least 75%.

5. A process according to claim 4 wherein said core is commercial purity copper, wherein said cladding is cupronickel.

6. A process according to claim 5 wherein said core is clad on both sides.

7. A process according to claim 1 wherein said core is an iron base alloy, the reduction in step C is from 40 to 65%, the cold reduction in step D is at least an additional 10% to give a total reduction of at least 60%.

8. A process according to claim 7 wherein said core is a commercial grade iron alloy and wherein said cladding is a copper base alloy.

9. A process according to claim 1 wherein said core is an aluminum base alloy, the reduction in step C is from 40 to 65%, the cold reduction in step D is at least an additional 10% to give a total reduction of at least 55%.

10. A process according to claim 9 wherein said core is aluminum alloy 7075 and wherein said cladding is a copper base alloy.

References Cited

UNITED STATES PATENTS

| | | | |
|---|---|---|---|
| 2,414,511 | 1/1947 | Dyar. | |
| 2,558,093 | 6/1951 | Kinney | 29—196.3 X |
| 2,707,323 | 5/1955 | Watson. | |
| 2,718,690 | 9/1955 | Ulam | 29—196.3 X |
| 2,753,623 | 7/1956 | Boessenkool. | |
| 2,860,409 | 11/1958 | Boessenkool | 29—497 |
| 3,050,834 | 8/1962 | Ulam | 29—196.3 |
| 3,165,828 | 1/1965 | Kennedy | 29—487 |
| 3,212,865 | 10/1965 | Miller | 29—196.3 |
| 3,295,197 | 1/1967 | Bunn | 29—497.5 |
| 3,298,803 | 1/1967 | Ulam | 29—196.3 |

FOREIGN PATENTS 37,669    1962    Japan.

JOHN F. CAMPBELL, Primary Examiner

RICHARD BERNARD LAZARUS, Assistant Examiner

U.S. Cl. X.R.

29—196.2, 196.3, 197, 472.3, 497.5, 498, 504